US008687886B2

(12) United States Patent
Tian

(10) Patent No.: US 8,687,886 B2
(45) Date of Patent: Apr. 1, 2014

(54) METHOD AND APPARATUS FOR DOCUMENT IMAGE INDEXING AND RETRIEVAL USING MULTI-LEVEL DOCUMENT IMAGE STRUCTURE AND LOCAL FEATURES

(75) Inventor: Yibin Tian, Menlo Park, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 189 days.

(21) Appl. No.: 13/340,513

(22) Filed: Dec. 29, 2011

(65) Prior Publication Data
US 2013/0170749 A1 Jul. 4, 2013

(51) Int. Cl.
*G06K 9/00* (2006.01)
(52) U.S. Cl.
USPC .......................................... 382/171
(58) Field of Classification Search
USPC ......... 382/173, 176, 180, 181, 190, 209, 218, 382/224, 305–306; 358/1.18, 403, 462; 715/209
See application file for complete search history.

(56) References Cited

U.S. PATENT DOCUMENTS

| 4,748,678 | A | 5/1988 | Takeda et al. |
| 5,628,003 | A | 5/1997 | Fujisawa et al. |
| 5,926,824 | A | 7/1999 | Hashimoto |
| 5,943,443 | A | 8/1999 | Itonori et al. |
| 6,002,798 | A | 12/1999 | Palmer et al. |
| 6,397,213 | B1 | 5/2002 | Cullen et al. |
| 6,621,941 | B1 * | 9/2003 | Syeda-Mahmood et al. . 382/306 |
| 7,475,061 | B2 | 1/2009 | Bargeron et al. |
| 7,751,624 | B2 | 7/2010 | Cantral |
| 7,912,291 | B2 | 3/2011 | Berkner et al. |
| 7,965,894 | B2 * | 6/2011 | Tian et al. ................. 382/218 |
| 7,999,657 | B2 * | 8/2011 | Tian et al. ................. 340/5.86 |
| 8,000,528 | B2 | 8/2011 | Ming et al. |
| 8,027,550 | B2 | 9/2011 | Chen et al. |
| 8,036,497 | B2 | 10/2011 | Kise et al. |
| 8,086,038 | B2 * | 12/2011 | Ke et al. ................... 382/176 |
| 8,351,706 | B2 * | 1/2013 | Hirohata ................... 382/192 |
| 2008/0162603 | A1 | 7/2008 | Garg et al. |
| 2008/0244384 | A1 | 10/2008 | Yoshitani |

OTHER PUBLICATIONS

Doermann, "The Indexing and Retrieval of Document Images: A Survey", Feb. 1998, "http://lampsrv02.umiacs.umd.edu/pubs/TechReports/LAMP_013/LAMP_013.pdf".

* cited by examiner

Primary Examiner — Jose Couso
(74) Attorney, Agent, or Firm — Chen Yoshimura LLP

(57) ABSTRACT

An image based document index and retrieval method is described. During document indexing, each source document is analyzed to generate index information at document, page, region and unit levels. Region and unit level index information is generated by segmenting each text region into units, constructing unit length or unit density histograms, and analyzing the units in a few most frequent bins of the histogram. The index information and the source document images are stored in a database. During document retrieval, a target document is analyzed to generate target index information in the same way as during document indexing. The target index information is compared to stored index information in a progressive manner (from higher to lower levels) to identify source documents with index information that matches the target index information. Fuzzy logic is used in the comparison steps to increase the robustness of the document retrieval.

18 Claims, 7 Drawing Sheets

Page header example

| | |
|---|---|
| Document ID | |
| Number of pages in document | |
| Pointer to previous page | |
| Page number | |
| Page bounding box (before normalization) | |
| Number of text regions (TR) | |
| Number of non-text regions (NTR) | |
| TR-1 bounding box | |
| ... | |
| TR-M bounding box | |
| TR-1 number of lines | |
| ... | |
| TR-M number of lines | |
| TR-1 unit length and/or unit density histogram | |
| ... | |
| TR-M unit length and/or unit density histogram | |
| TR-1 mode of histogram, number of unit types | |
| ... | |
| TR-M mode of histogram, number of unit types | |
| TR-1 mode of histogram, type 1 unit locations | |
| ... | |
| TR-1 mode of histogram, type $K_1$ unit locations | |
| ... | |
| TR-M mode of histogram, type 1 unit locations | |
| ... | |
| TR-M mode of histogram, type $K_M$ unit locations | |
| TR-1 mode of histogram, type 1 image features or image patch | |
| ... | |
| TR-1 mode of histogram, type $K_1$ image features or image patch | |
| ... | |
| TR-M mode of histogram, type 1 image features or image patch | |
| ... | |
| TR-M mode of histogram, type $K_M$ image features or image patch | |
| NTR-1 features | |
| ... | |
| NTR-L features | |
| Link/pointer to the entire image | |
| Pointer to next page | |

Fig. 5

METHOD AND APPARATUS FOR DOCUMENT IMAGE INDEXING AND RETRIEVAL USING MULTI-LEVEL DOCUMENT IMAGE STRUCTURE AND LOCAL FEATURES

BACKGROUND OF THE INVENTION

1. Field of the Invention

This invention relates to image based document management, and in particular, it relates to image based document indexing and retrieval.

2. Description of Related Art

In an image based document management system, document indexing refers to storing images of document in association with information regarding the document (index information) in a document database; document retrieval refers to retrieving desired document images for review, manipulation, management or other purposes, such as for comparing a stored document image with a scanned image of a hard copy document. A common type of document image indexing and retrieval method relies on a document ID placed on the document; its images are stored in a database along with the document ID for document management purposes. For example, a printed document can be scanned back and the document ID carried on the printed document is read, the stored image is retrieved from the database based on the document ID, and the stored image may be compared to the scanned image of the printed document. The document ID may be carried on the document itself either explicitly as alphanumerical symbols or barcodes (such as UPC code, OR code, etc.), or implicitly as watermarks, decorative glyphs or other data hiding patterns that are not perceptually visible.

In certain applications, explicit marks on the documents are considered intrusive and not acceptable to customers. Implicit data hiding methods are generally sensitive to noise. In other cases, the added document ID, either explicit or implicit, may be damaged, contaminated, or missing during print-and-scan or document circulation processes. Document image indexing and retrieval systems using document characteristics and/or image features, if implemented properly, are more reliable than the methods that rely on document ID.

A number of methods have been proposed for retrieval of document images. D. Doermann, The Indexing and Retrieval of Document Images: A Survey (1998), available on the Internet at http://lampsrv02.umiacs.umd.edu/pubs/TechReports/LAMP_013/LAMP_013.pdf, summarizes the advances in this area up to 1998. Existing document image retrieval methods can be classified into two categories. The popular approach is to use some text string codes that are obtained via user input, annotations, and/or by Optical Character Recognition (OCR). Examples include U.S. Pat. Nos. 4,748,678, 5,628,003, 5,628,003, 7,751,624 and US Patent Application Publication No. 2008/0162603. These methods are language dependent due to the utilization of OCR or user input. The second approach is image based. Image based document retrieval can be further separated into two types: (1) usage of document layout and zone/block information, for example, U.S. Pat. Nos. 5,926,824, 6,002,798 and US Patent Application Publication No. 2008/0244384 A1; (2) usage of some image features, for example, U.S. Pat. Nos. 5,943,443, 7,475,061 and 8,036,497 use character features or word level topology, U.S. Pat. Nos. 6,397,213 and 8,027,550 extract features from document zone/blocks, and U.S. Pat. No. 7,912,291 employs bit features in compressed JPEG format. Many of the aforementioned methods require user interactions to carry out retrieval correctly due to the deficient distinctiveness of the retrieval information.

SUMMARY

The present invention is directed to a document image indexing and retrieval method using multi-level document image structure and local features.

An object of the present invention is to provide a more efficient and reliable method for indexing and retrieval of document images.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides an image-based document indexing method which includes: (a) obtaining a document image including at least one page; (b) segmenting the page of the document image into one or more text regions; (c) analyzing the page of the document image to generate page-level index information; (d) for each text region in the page: (d1) segmenting the region into a plurality of units each having a unit length and/or a unit density; and (d2) generating a unit length histogram and/or a unit density histogram, wherein the unit length histogram has a plurality of bins and represents a relationship between the unit length and a frequency of occurrence of the units within the region, the unit density histogram has a plurality of bins and represents a relationship between the unit density and a frequency of occurrence of the units within the region, and wherein each unit of the region belongs to a bin of the unit length histogram or the unit density histogram; wherein the unit length histogram or unit density histogram forms region-level index information for the region; (e) for each text region, and for each of a number of designated bins of the unit length histogram or unit density histogram, including a most frequent bin and zero or more bins around the most frequent bin: (e1) characterizing each unit belonging to the bin into a unit type and obtain a number of unit types in the bin; and (e2) for each of a number of designated unit types, obtaining a number of units belonging to the unit type, locations of such units, and a unit feature vector or unit image patch of the unit type; wherein the identity of the designated bins, the numbers of unit types in each designated bin, the number of units belonging to each designated unit type and the locations of such units, and the unit feature vector or unit image patch of each designated unit type collectively form unit-level index information for the region; and wherein the page-level index information, the region-level index information and the unit-level index information collectively form the document index information of the document image.

In another aspect, the present invention provides an image-based document retrieval method which includes the document indexing method described above, wherein the document image is a target document image, the document retrieval method further including: (f) accessing a database which stores index information for a plurality of source documents, the index information including, for each source document, page-level index information, region-level index information and unit-level index information, wherein the index information has been generated for the stored documents using the document indexing method described above; (g)

comparing the page-level index information for at least one page of the target document image with stored page-level index information for a plurality of source documents to identify one or more pages of one or more source documents with page-level index information that matches the page-level index information of the page of the target document; (h) comparing the region-level index information for the page of the target document image with stored region-level index information for the one or more pages identified in step (g) to further identify one or more pages of one or more source documents with region-level index information that matches the region-level index information of the page of the target document; (i) comparing the unit-level index information for the page of the target document image with stored unit-level index information for the one or more pages identified in step (h) to further identify one or more pages of one or more source documents with unit-level index information that matches the unit-level index information of the page of the target document.

In another aspect, the present invention provides an image-based document retrieval method which includes: (a) obtaining index information for a target document image, the index information including page-level index information that includes geometric characteristics of a page of the target document, region-level index information that includes geometric characteristics of text regions of the page of the target document, and unit-level index information that includes geometric characteristics of text units in each text region of the page of the target document; (b) accessing a database which stores index information for a plurality of source documents, the index information including, for each source document, page-level index information that includes geometric characteristics of a page of the source document, region-level index information that includes geometric characteristics of text regions of the page of the source document, and unit-level index information that includes geometric characteristics of text units in each text region of the page of the source document; (c) comparing the page-level index information for the page of the target document image with stored page-level index information for a plurality of source documents to identify one or more pages of one or more source documents with page-level index information that matches the page-level index information of the page of the target document; (d) comparing the region-level index information for the page of the target document image with stored region-level index information for the one or more pages identified in step (c) to further identify one or more pages of one or more source documents with region-level index information that matches the region-level index information of the page of the target document; (e) comparing the unit-level index information for the page of the target document image with stored unit-level index information for the one or more pages identified in step (d) to further identify one or more pages of one or more source documents with unit-level index information that matches the unit-level index information of the page of the target document.

In another aspect, the present invention provides an image-based document retrieval method which includes: (a) obtaining index information for a target document image, the index information including page-level index information that includes geometric characteristics of a page of the target document, region-level index information that includes geometric characteristics of text regions of the page of the target document, and unit-level index information that includes geometric characteristics of text units in each text region of the page of the target document; (b) accessing a database which stores index information for a plurality of source documents, the index information including, for each source document, page-level index information that includes geometric characteristics of a page of the source document, region-level index information that includes geometric characteristics of text regions of the page of the source document, and unit-level index information that includes geometric characteristics of text units in each text region of the page of the source document; (c) for each of at least some of the source documents, calculating a distance between a feature vector of the target document image, which is constructed from one or more levels of index information of the target document image, and a feature vector of the source document, which is constructed from corresponding one or more levels of index information of the source document; (d) based on the calculation in step (c), identifying one of the at least some of the source documents that has a smallest distance, or identifying zero or more of the at least some of the source documents that have a distance smaller than a predetermined threshold.

In other aspects, the present invention provides a computer program product comprising a computer usable non-transitory medium (e.g. memory or storage device) having a computer readable program code embedded therein for controlling a data processing apparatus, the computer readable program code configured to cause the data processing apparatus to execute one or more of the above methods.

It is to be understood that both the foregoing general description and the following detailed description are exemplary and explanatory and are intended to provide further explanation of the invention as claimed.

BRIEF DESCRIPTION OF THE DRAWINGS

FIG. 5 illustrates an exemplary page header structure useful in the document indexing and retrieval methods according to embodiments of the present invention.

DETAILED DESCRIPTION OF PREFERRED EMBODIMENTS

Figure 1:
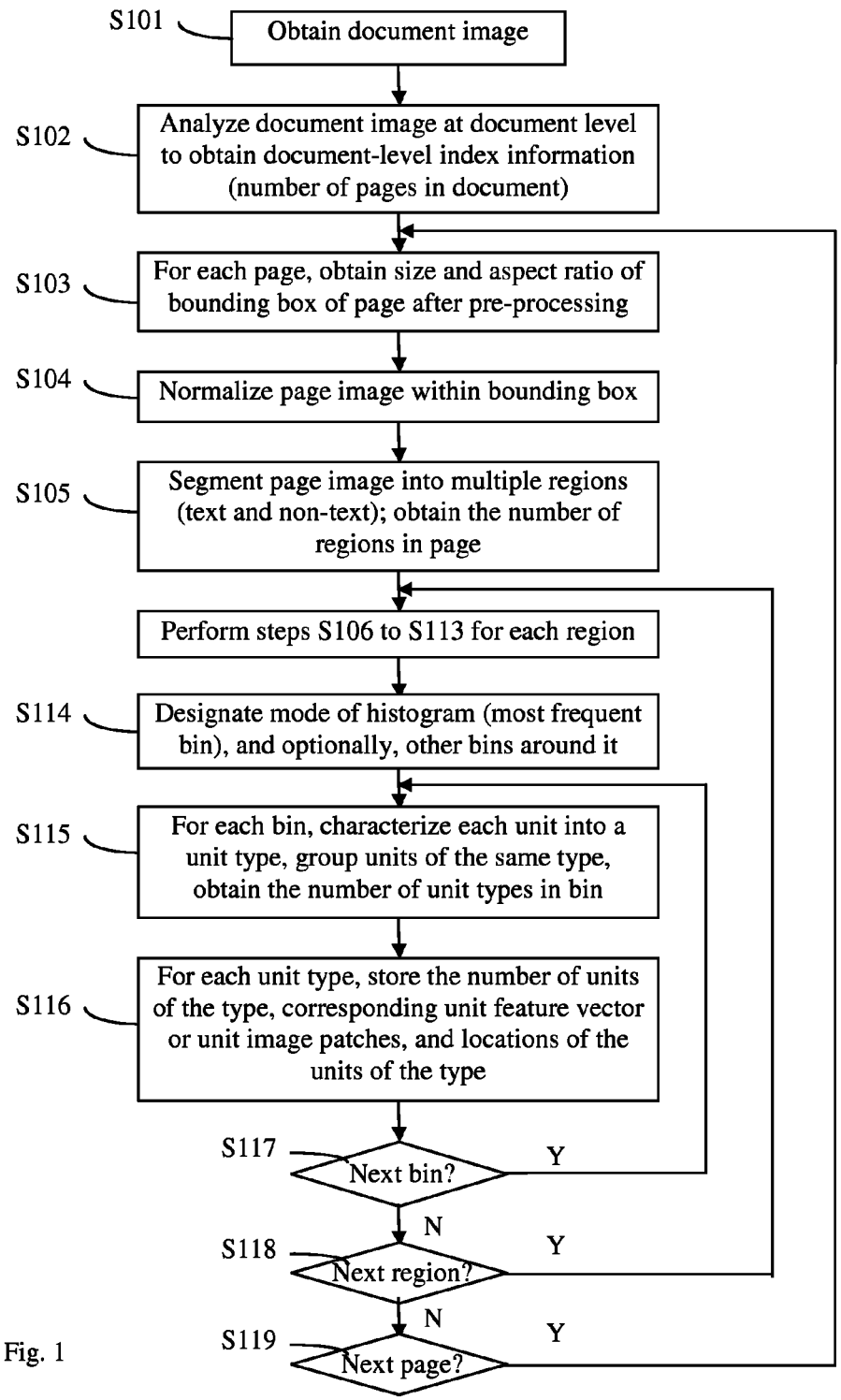
FIGS. 1 and 1A schematically illustrate an image based document indexing method according to an embodiment of the present invention.

Embodiments of the present invention provide a method that uses a combination of hierarchical document structure information and local image patches/features at unit level to index and retrieve document images. During both indexing and retrieval, a document is analyzed at multiple levels including, for example, a document level, a page level, a region (e.g. paragraphs or images) level, and a unit level to obtain various levels of index information. Index information of indexed documents along with the document images is stored in a database. The retrieval is based on the index information. During retrieval, a comparison of hierarchical document structures using fuzzy logic improves retrieval so that the retrieval is robust even when the target documents have been slighted tampered with or damaged. The method is not sensitive to the language of the document and can be used for a number of languages (including most Indo-European languages and some East Asian languages) without a priori knowledge of the specific languages of the document. Further, the retrieval process may be carried out automatically without user intervention.

An image based document indexing process is described with reference to FIGS. 1 and 1A (method flow chart) and FIGS. 3 and 4 (showing the resulting index information). This may be referred to a document indexing and storing stage. As shown in FIG. 1A, a source document image is first obtained (step S101). Certain metadata may be obtained in this step if it is available. This may be done by scanning a hard copy document, by generating a document image using a computer program that converts non-image electronic document into images, by receiving a document image from another source, etc. The document image is preferably a bitmap image or is converted to a bitmap image. In step S102, the document image is analyzed at the document level to obtain document-level index information which includes the number of pages of the document. The document-level index information may be stored in a document header. The resulting index information is schematically indicated as box 31 in FIG. 3.

Next, the document is analyzed at the page level, in steps S103 to S105 which are performed for each page, to generate page-level index information for each page. First, the image undergoes some pre-processing, such as denoising, deskew and/or binarization. Then the size and aspect ratio of the bounding box of the page image are obtained (step S103). A bounding box is the smallest rectangular box that contains all contents of the desired region (here, a page). The page image is then normalized so that the coordinates of the page image within the bounding box are within a fixed range (for example, [0, 1]) in both horizontal and vertical directions (step S104). Then, the page image is segmented into one or more text regions and non-text (i.e. image or graphics) regions and the number of segmented regions in the page is obtained (step S105). Many document image segmentation methods are known, and any suitable methods can be used for the segmentation step S105. For example, a document image can be segmented into text and non-text regions using connected component analysis or texture extraction. The number of segmented (text and non-text) regions, along with the page bounding box size and aspect ratio obtained in step S103, constitute the page-level index information, as schematically indicated as box 32 in FIG. 3.

Each text region is preferably a paragraph of text, but other types of text regions may be used, such as multiple paragraphs, multiple lines, etc. To improve reliability of processing described below, small neighboring text regions may be merged. The document is analyzed at the region level, in steps S106 to S113 (FIG. 1A), which are performed for each region of each page, to generate region-level index information for each text and non-text region. Regardless of the type of region, the bounding box of the region is obtained (step S106). Steps S108 to S112 are performed for text regions and step S113 is performed for non-text regions.

If the region is a text region ("Y" in step S107), the number of lines of text in the region is obtained (step S108). This may be done by segmenting the region into lines using a suitable segmentation method, such as analyzing the horizontal projection profile or connected components of the image of a text region. The region is then further segmented into units (step S109). This segmentation step may be performed using a morphological operation and connected component analysis; many such methods are known and any suitable method can be used for this step. When the language of the document is one (such as Indo-European languages) in which words are formed of a linear sequence of multiple characters with spaces between words, the units resulting from this segmentation step are typically words, and the units tend to have different lengths corresponding to word lengths. When the language is one (e.g. certain East Asian languages) in which all characters have approximately the same size with equal spaces between characters, the units resulting from this segmentation step are typically characters, and the units tend to have very similar lengths in the direction of writing.

In step S110, a histogram of the number of occurrence (or equivalently, frequency of occurrence) of units vs. unit length is constructed for the region. This is done by dividing the x-axis (unit length) into a number of bins, which can be quantified using the number of characters in each unit. The unit length histogram is examined to determine whether it has a narrow shape, i.e., if it has high numbers of occurrence for a small number of bins (e.g., fewer than 4 or 5 bins) and substantially lower numbers of occurrence for other bins (step S111). A narrow histogram is indicative of the second type of languages described above. If the histogram has a narrow shape ("Y" in step S111), a histogram of the number of occurrence of units vs. unit pixel density is constructed for the region (step S112). Unit pixel density is defined here as the number of non-white pixels divided by total number of pixels in the bounding box of the unit, but other suitable definitions may be used as well. For the second type of languages in which characters tend to have the same length, the pixel density of characters will likely have a wide distribution, resulting in a relatively wide histogram.

Sometimes, a text region may include both of the two types of languages described above. To deal with such a situation, in step S111, a determination is made as to whether the bin for extremely small unit length (for example, 1 and 2) in the unit length histogram has a relatively high occurrence frequency. Since in the first type of languages words having a single character should not occur at a very high frequency, such a high frequency of the bin for extremely small unit length may indicate that mixed languages are present. If mixed languages are present, the units having extremely small unit length may be separated out and a unit density histogram may be constructed for them. Then in the subsequent steps described below, both histograms may be used.

If the region is a non-text region ("N" in step S107), i.e., it is an image or graphics, a feature vector of the image/graphics is obtained (step S113). A feature vector of an image/graphics is an n-dimensional vector of numerical features that represent the object. For example, the feature vector may include image skeletons, image edges and/or corners, a set of image moments such as Zernike and pseudo-Zernike moments, or shape descriptors etc., or their combinations. The vector space associated with these vectors is often called the feature space. Optionally, other features of each non-text region such as colors, textures, and/or phase congruency etc., can also be extracted and used for indexing and retrieval.

Figure 3:
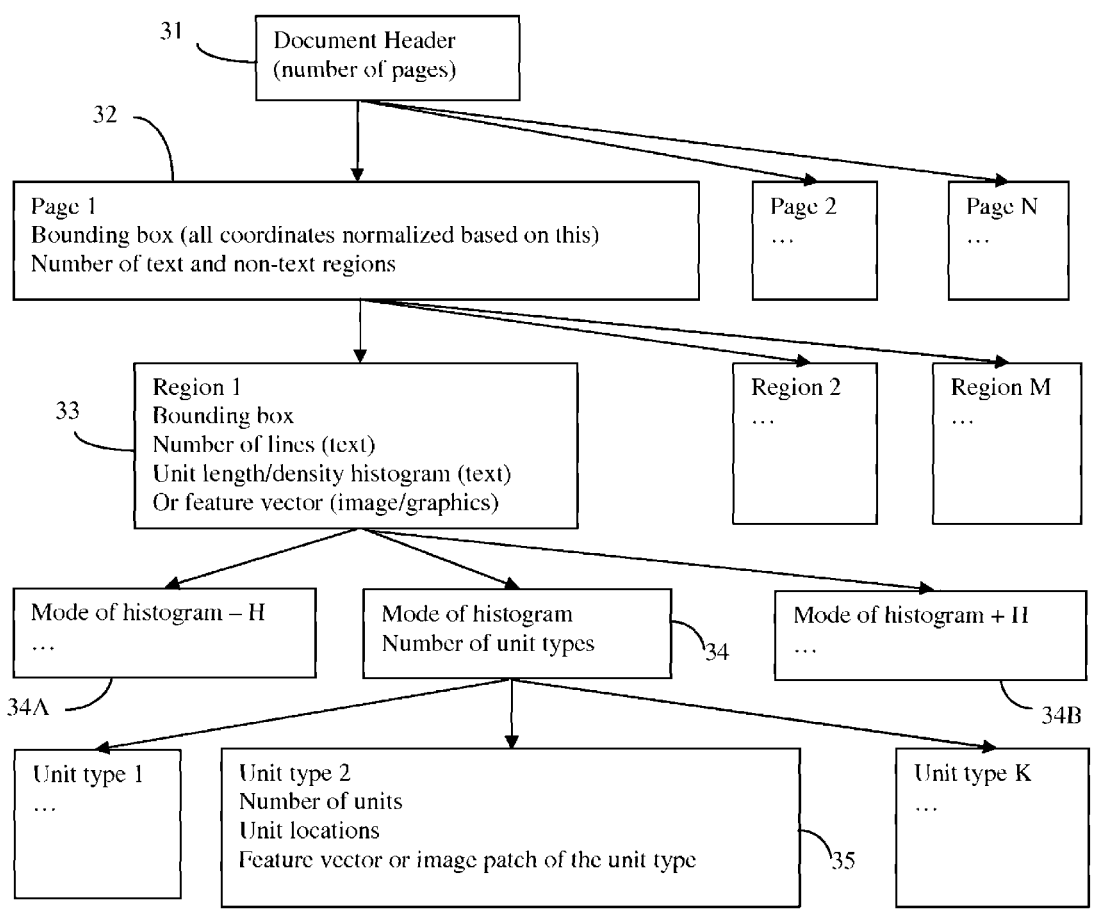
FIGS. 3 and 4 schematically illustrate the index information at various levels resulting from the document indexing method of FIGS. 1 and 1A.
Figure 4:
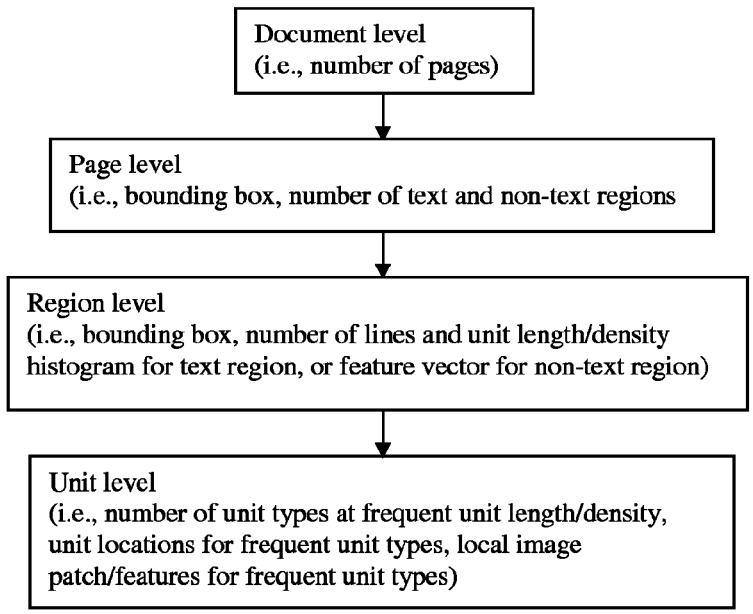

The bounding box (size and aspect ratio), the number of lines (for text regions), the unit length or unit density histogram (for text regions), and the feature vector (for non-text regions) constitute the region-level index information, as schematically indicated as box 33 in FIG. 3.

In steps S114 to S116, the document is analyzed at the unit level to generate unit-level index information. First, from either the unit length histogram (obtained step S110) or the unit density histogram (obtained in step S112), or each of them if both histograms are used, the bin that has the highest number of (or most frequent) occurrence in the respective histogram is designated as the "mode of histogram" (step S114). The following unit-level analysis (steps S115 and S116) is performed for the units within the mode of histogram, and (optionally) also within a number of other bins around the mode of histogram, such as "mode of histogram−1," . . . "mode of histogram−H," "mode of histogram+1," . . . "mode of histogram+H," as schematically indicated by boxes 34, 34A and 34B in FIG. 3. These bins may be referred to as the designated bins.

For example, if the mode of histogram correspond to 6-letter words, the surrounding bins may correspond to 5-letter to 7-letter words. H is a suitable integer, which may be chosen based on the size of the region, how many units are in the mode of histogram, etc., so that a sufficient number of units are present in the bins to obtain sufficient information for indexing. The number H may be predetermined for all regions, or dynamically determined for each region. Also, the choice of H may depend on the size of the database; if the database contains a relatively large number of documents, a higher H should be used so more information can be used to reduce the chance of accidental matches.

In step S115, each unit within the bin is characterized into a unit type; units of the same type are grouped; and the number of unit types in the bin is obtained (as schematically indicated in box 34 of FIG. 3). In this step, each unit is treated as an image, and the feature vector of the unit image (the local feature vector), or the unit image itself (referred to as the image patch), is used to characterize units into unit types. The image features may be image skeletons, image edges and/or corners, a set of image moments such as Zernike and pseudo-Zernike moments, or shape descriptors etc., or their combinations. Thus, units of the same type are units having the same feature vector, or units having the same image. For example, a unit type may correspond to a word, and multiple occurrences of the same word in a region will be grouped as one unit type. If feature vectors are used to characterize units, depending on the choice of features constituting the feature vector, it is possible for different words to be characterized as the same unit type. Preferably, the chosen features should be insensitive to small amounts of blur, rotation, scaling and/or translation.

After the units are characterized into unit types, for each unit type, the number of units belonging to the unit type, the locations of these units, and the unit feature vector or unit image patch of the unit type, are obtained and stored as a part of the unit-level index information (step S116), as schematically indicated as box 35 in FIG. 3. Alternatively, in step S116, the above unit-level index information may be obtained and stored for only a number of most frequently appearing unit types, rather than for each unit type. These unit types may be referred to as designated unit types, which may include all unit types. The unit-level index information also includes the mode of histogram (and optionally the other designated bins), and the numbers of unit types in the designated bins obtained in step S115 (as indicated in box 34).

The various steps described above are repeated for all bins (if more than one bin is used in the unit level analysis) (step S117), all regions of a page (step S118), and all pages (step S119).

As described above, FIG. 3 schematically illustrates the various levels of index information obtained in the document indexing process. FIG. 4 is a simplified schematic diagram also illustrating the various levels of index information.

The index information of various levels is stored in association with the document image in a predetermined format. For example, a page header may be provided for each page of the document to store the index information, an example of which is illustrated in FIG. 5. In the example of FIG. 5, M is the number of text regions in the page; $K_1$ to $K_M$ are the number of unit types in the M text regions; and L is the number of non-text regions in the page. The index information items may be ordered in a hierarchical manner, i.e., index information of a higher level is located before the index information of a lower level. The example shown in FIG. 5 is organized in such a hierarchical manner. This will make it more convenient for the document retrieval process as will be explained in detail later.

Figure 6A:
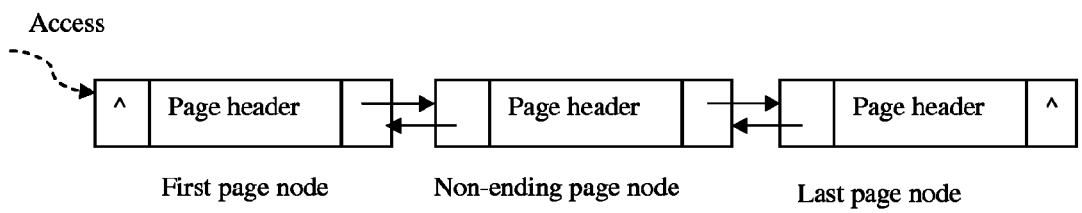
FIGS. 6A and 6B schematically illustrate an arrangement of page headers according to an embodiment of the present invention.
Figure 6B:
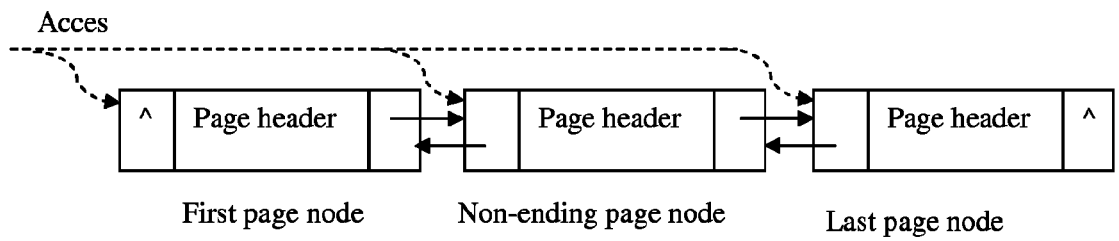

FIGS. 6A and 6B schematically illustrate how the page headers may be linked together. Each page header has a pointer that points to the page header of the previous page, and a pointer that points to the page header of the next page. The dashed lines in FIGS. 6A and 6B illustrate serial and parallel page access, respectively, during document retrieval which will be explained later.

Figure 1A:
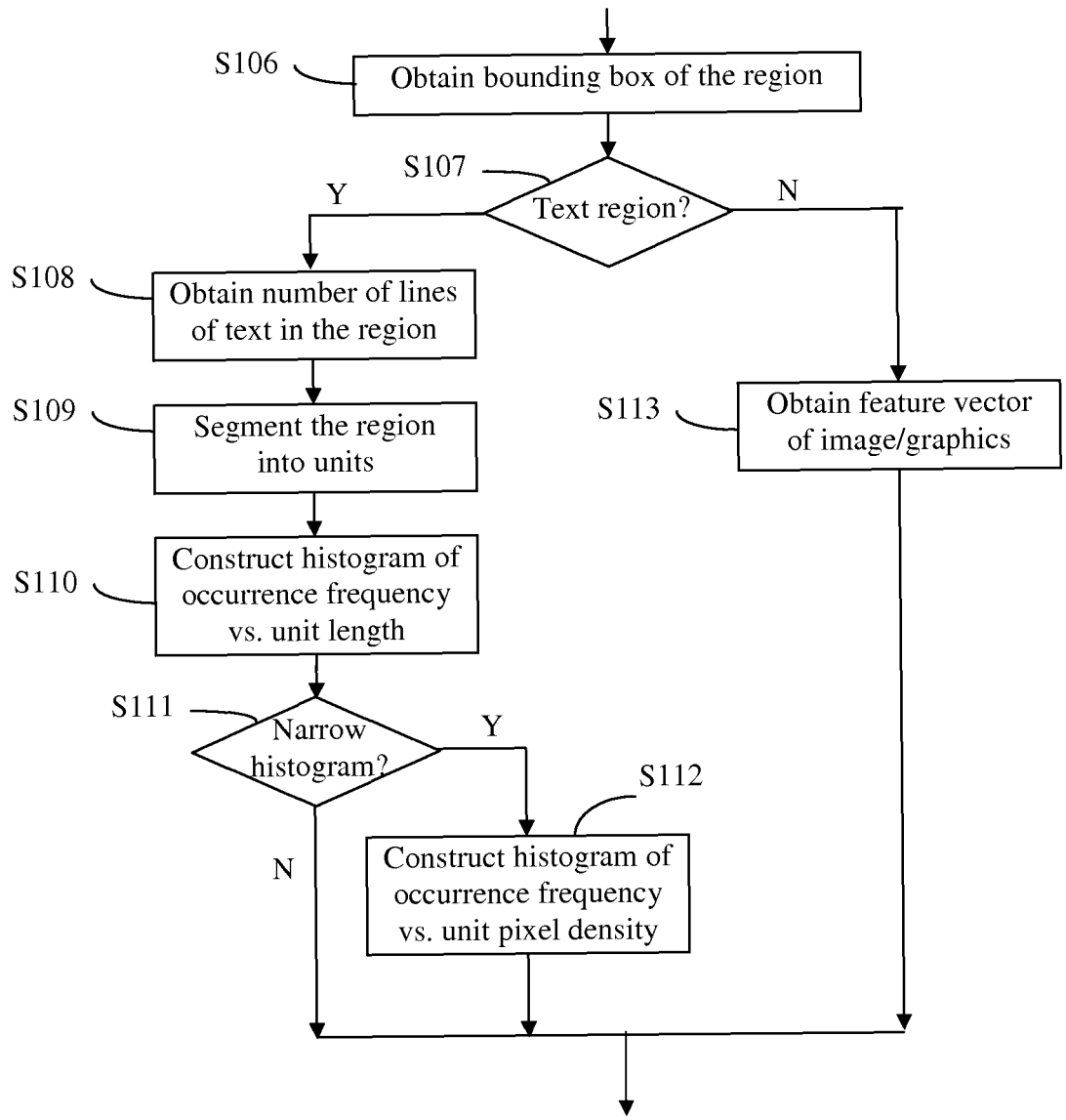
Figure 2:
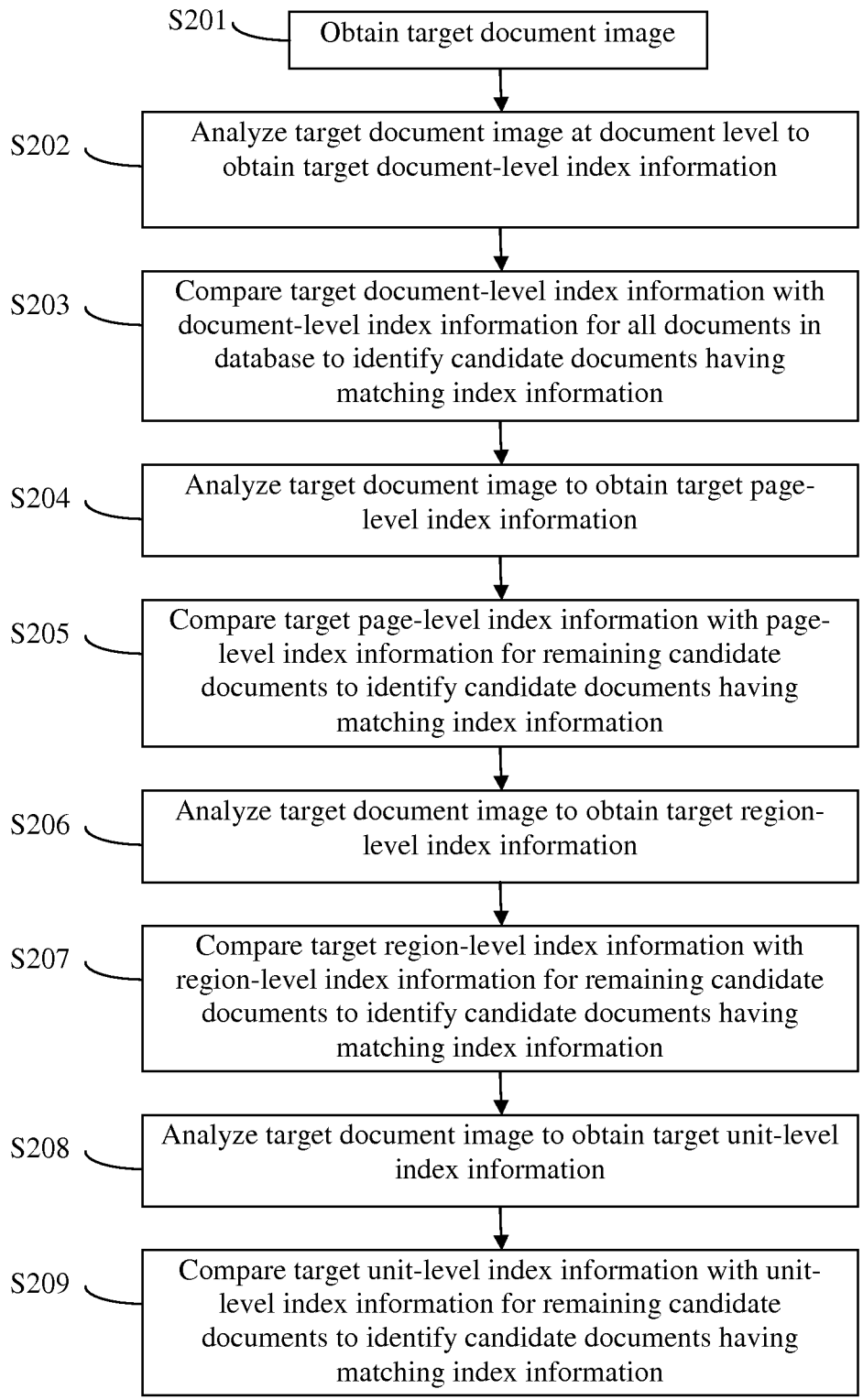
FIG. 2 schematically illustrates an image based document retrieval method according to an embodiment of the present invention.

FIG. 2 schematically illustrates an image based document retrieval process. This process accesses a database which stores multiple source document images along with associated index information which has been generated by the document indexing process described in FIGS. 1 and 1A. The goal of the retrieving process is to retrieve one stored source document that matches a target document. The target document is one that purports to be an original or copy of a document that has been previously indexed and stored in the database.

During retrieval, the target document is analyzed in the same manner as in the document indexing process to generate target index information at various levels (e.g. in steps S202, S204, S206 and S208 of FIG. 2), and the target index information is compared to the index information obtained from the database (e.g. in steps S203, S205, S207 and S209 of FIG. 2) to identify the matching document. In other words, a part of the document retrieval process is a document indexing process identical to the document indexing process done at the indexing and storing stage. It should be understood that while the term "indexing" or "index" is used in the context of the document retrieval stage, the image being indexed here (the target document image) and the index information so generated do not need to be stored, even though the term "indexing", when used in the context of the document indexing stage, may imply that the image being indexed and the index information will be stored.

Fuzzy logic is applied when comparing the index information (including image features) so that the retrieval process is tolerant to a small amount of document damages, alterations or missing parts in the target document images caused by document reproducing or circulation process of the target document. In some or all of the comparison steps described below (such as steps S203, S205, S207 and S209 of FIG. 2), tolerance values are used for the comparison. Thus, two sets of index information are deemed to be "similar" to or "match" each other if their differences are within certain tolerance values. The concept of tolerance includes, when two values are compared to teach other, an allowable difference between their values. It also includes, when a group of values are compared to another group of corresponding values, an allowable number of values that can be substantially different between the two groups. When the terms "similar", "dissimilar", "matching" or "non-matching" are used in this disclosure, it should be understood to mean that the items being compared agree/differ with each other to within certain tolerance amounts (which may include zero). Various suitable tolerance values are used in these comparison steps. The tolerance values are preferably pre-determined and programmed into the retrieval algorithm, and they may have been arrived at through experiments with test documents. Alternatively, the tolerance values may be settable or adjustable by the user. As another alternative, pre-determined tolerance values are used first to perform a retrieval process, and if too many matches are found or no match is found, the tolerance values may be optionally adjusted by the user or by the software to fine-tune the retrieval process. Persons of ordinary skill in the art can readily obtain suitable tolerance values through routine experimentation in order to implement the retrieval algorithm.

Because the goal of the retrieval process is to compare and match target index information with stored index information of candidate documents, and because the index information includes a large number of information items (see, e.g., FIG. 3 and FIG. 5), the flow of the comparison process may have many variations in terms of the order of comparing various items. In general, it is preferred that the comparison of index information be carried out in a sequential and hierarchical manner, i.e., a higher level of index information is compared to identify a group of candidate documents or to eliminate documents as candidates, and the comparison goes to a lower level of index information only for the candidate documents that remain candidates by previous comparison steps.

In one example of a comparison sequence, a higher level of comparison is applied to all candidate documents, and some candidate documents are eliminated due to non-matching index information at that level; a lower level comparison is then applied to the remaining candidate documents to further eliminate some documents, and so on. This way, the field of candidate documents is progressively narrowed until one (or zero, or more than one) matching document is found that matches all index information of the target document. In another example (less preferred), the comparison focuses on one candidate document at a time, and progressively lower levels of comparison is applied to this document until non-matching index information is found and the document is eliminated as a candidate. In a third example, a combination of the above two approaches is used. For example, document-level index information (number of pages) comparison is applied first to all documents in the database to eliminate documents having non-matching numbers of pages (with a tolerance value), and the remaining candidate documents are processed one by one using the second approach above. In a fourth example, the comparison is performed for one page of the target document at a time. All levels of index information for this page are used to compare to the candidate documents, in a progressive (higher to lower level) manner.

Other comparison flows may be used. Thus, the comparisons in steps S203, S205, S207 and S209 may be performed on various groups of candidate documents in various orders depending on the specific comparison flow employed. The invention is not limited to any particular comparison flow or the order of comparison shown in the example of FIG. 2.

An exemplary comparison flow is described below with reference to FIG. 2. First, a target document image is obtained (step S201). This may be done by scanning a hard copy document, or receiving a document image from an external source. The document image is preferably a bitmap image or is converted to a bitmap image. In step S202, the target document image is analyzed at the document level to obtain target document-level index information in a manner identical to step S102 of the indexing process. As in the indexing process, the document-level index information includes the number of pages of the document. The target document-level information is compared to index information in the database to identify all stored documents that have similar document-level information (number of pages) as candidate matching documents (step S203). This comparison step is applied to all documents in the database, because before this comparison step, all documents are candidate documents. The tolerance value of this comparison step may be, for example, plus or minus 1 page, etc. Thus, even if the target document is missing some pages or has some extra pages, a potential match may still be found.

Then, each page of the target document is indexed at the page level to generate target page-level index information (step S204), in a manner identical to steps S103 to S105 of FIG. 1. As in the indexing process, the page-level index information includes the page bounding box size and aspect ratio, and the number of segmented text and non-text regions on the page. In step S205, the target page-level index information is compared to the page-level index information for all pages of all remaining candidate documents (i.e. candidates identified in step S203). If the target page-level index information for each page is similar to the page-level index information of a corresponding page of a candidate document, the candidate document remains a candidate. If not, the candidate document is eliminated as a candidate.

It should be noted that the corresponding pages in the target and candidate documents do not have to be in same order. This way, even if the page order of the target document have been changed (which may happen when the target document was circulated in hard copy form), a match is still possible. Further, in step S205, appropriate tolerance is allowed so that even if a number (within a tolerance value) of pages of the target document do not have a corresponding page in a candidate document, the candidate document remains as a candidate. For example, if the target document has 10 pages, and 9 of the 10 pages match 9 corresponding pages of an 11-page candidate document, the candidate document may still be deemed a candidate (i.e., not eliminated). As a result of step S205, one or more (or zero) candidate documents will remain as candidates; further, a correspondence between the pages of the target document and the pages of each remaining candidate document is established.

As mentioned earlier, the page headers stored in the database may be linked together as shown in FIGS. 6A and 6B. Because the sequence of pages in the target document and the candidate documents are allowed to be different, parallel page access shown in FIG. 6B provides convenience for accessing the stored page header information out of order.

Then, for each page of the target document, indexing is done at a region level to obtain target region-level index information for all regions of the page (step S206), in a manner identical to steps S106 to S113 of FIG. 1A. As in the indexing process, the region-level index information includes the region bounding box (size and aspect ratio), the number of lines (for text regions), the unit length or unit density histogram (for text regions), and the feature vector (for non-text regions). In step S207, the target region-level index information for each page is compared to the region-level index information of the corresponding page of the remaining candidate document. For each candidate document, if the target region-level index information for all pages is similar to the region-level index information of the corresponding pages of the candidate document, the candidate document remains a candidate. If not, the document is eliminated as a candidate. As a result of step S207, one or more (or zero) candidate documents will remain as candidates.

In step S207, the comparison for the region-level index information for multiple candidate documents may be done in various orders. In one example, the target region-level index information for the first page of the target document is compared to the region-level index information of the corresponding first page of all remaining candidate documents, and some documents are eliminated in this process; then, the comparison is repeated using the next page of the target document to eliminate some more candidate documents; and so on until all pages of the target document are processed. In another example, the target region-level index information for all pages of the target document is compared to the region-level index information of all corresponding pages of one candidate documents, and as soon as a non-match (i.e. dissimilar index information) is found for a page, the documents is eliminated, without processing the remaining pages; and the process is repeated for the next remaining candidate, and so on. Other suitable order of comparison may be used.

In the comparison step S207, for each pair of pages, multiple items of index information are compared, including for example (refer to FIG. 5), TR-1 bounding box, . . . TR-M bounding box, TR-1 number of lines, . . . TR-M number of lines, TR-1 unit length or unit density histogram, . . . TR-M unit length or unit density histogram, NTR-1 features, . . . NTR-L features. Preferably, these items are compared sequentially, and as soon as an item in a candidate document page is found to be non-matching with the target value, the document is eliminated, without comparing the remaining items.

Then, for each region of the target document, indexing is done at a unit level to obtain target unit-level index information for the region (step S208), in a manner identical to steps S114 to S116 of FIG. 1. As in the indexing process, the unit-level index information includes the mode of histogram (and optionally the other designated bins), the numbers of unit types in the designated bins, and for each unit type, the number of units belonging to the unit type, the locations of these units, and the unit feature vector or unit image patch. In step S209, the target unit-level index information for each region is compared to the unit-level index information of the corresponding region of each remaining candidate document. For each candidate document, if the target unit-level index information for all regions of all pages is similar to the unit-level index information of the corresponding regions and pages of the candidate document, the candidate document remains a candidate. If not, the document is eliminated as a candidate. As a result of step S209, one or more (or zero) candidate documents will remain as candidates.

If the index information includes unit image patches, the corresponding unit image patches in the target and candidate documents may be compared directly using image comparison directly (e.g., by using cross correlation, Hausdorff distance, of any other suitable method).

As in step S207, the comparison of unit-level index information may be done in various orders in step S209. In one example, the target unit-level index information for the first region of the first page is compared to the unit-level index information of the corresponding region of all remaining candidate documents, and some documents are eliminated in this process; then, the process is repeated using the next region of the target document to eliminate some more candidate documents; and so on until all regions of all pages of the target document are processed. In another example, the target unit-level index information for all regions on all pages of the target document is compared to the unit-level index information of all corresponding regions of one candidate documents, and as soon as a non-match (i.e. dissimilar index information) is found for a page, the documents is eliminated, without processing the remaining regions; and the process is repeated for the next remaining candidate, and so on. Other suitable order of comparison may be used.

At the end of step S209, zero, one, or more candidate document will be identified which will have index information that match all of the target index information of the target document.

In an alternative comparison flow, the comparison focuses on one page (e.g. page one, or page two) of the target document first. All levels of index information for this page are used to compare to the candidate documents, in a progressive (higher to lower level) manner similar to steps S203 to S209 shown in FIG. 2. At the end of this process, a number of candidate documents having one page that matches, at all levels, the page of the target document are identified. Empirically, the number of such candidate documents should be small, and there is a high likelihood that one of these candidate documents is the matching document. Then, the remaining pages of the target document and each candidate document are compared to confirm a document match. An advantage of this comparison flow is that comparison can start as soon as one or two pages of the target document are scanned (in this scenario, the comparison number of pages (document-level index information) may be omitted as it may not be available yet).

In the process flow shown in FIG. 2, the indexing of the target document is performed one level at a time, and the index information at a higher level is used to eliminate candidate documents before the next level of index information is generated. Alternatively, the flow may be one in which the target document is indexed first to generate all levels of index information, and then the index information is used in the comparison process to retrieve a matching document. The former approach has better performance because, in the event that no matching document is found by comparison a higher level, indexing of the target document at lower levels may be omitted and a negative retrieval result can be more quickly reached.

Figure 7:
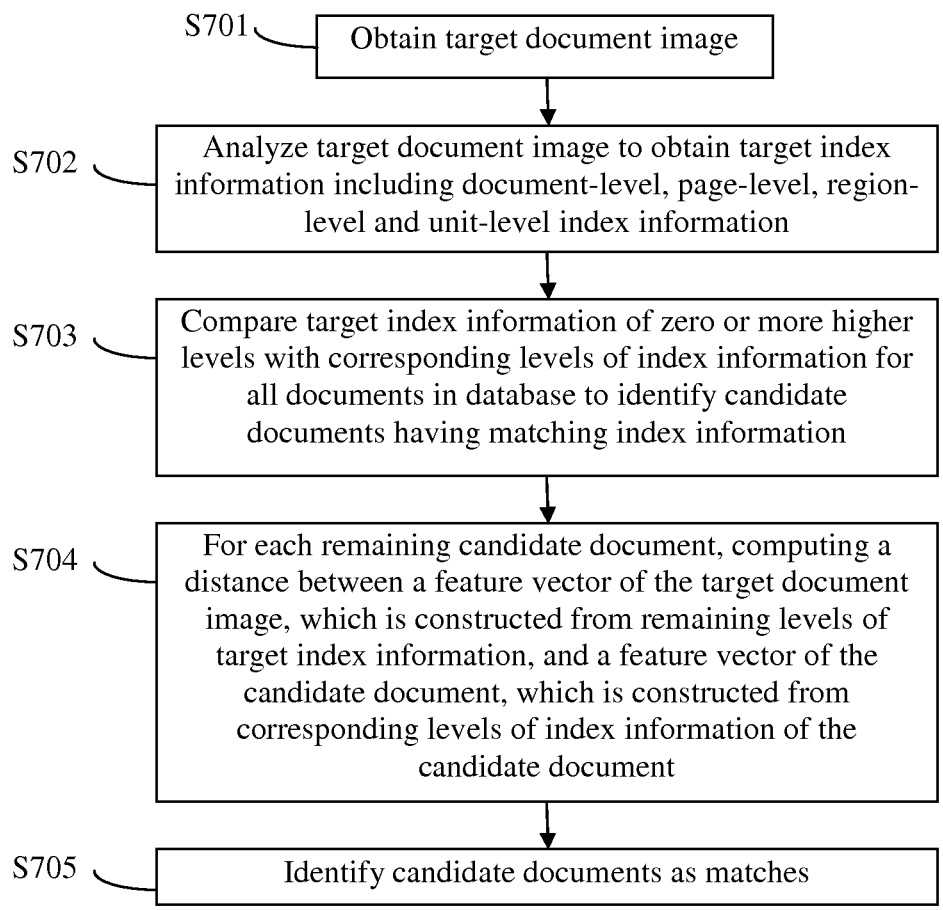
FIG. 7 schematically illustrates an image based document retrieval method according to another embodiment of the present invention.

Another alternative document retrieval approach is to arrange all or most index information of each document (both the target document and the candidate documents in the database) into one feature vector, and retrieval can be done by computing the distances between the target feature vector and the feature vectors of all candidate documents in the database. Different features can be weighed differently for distance calculations. The candidate document with the shortest distance to the target document is considered the best match; or those candidate documents whose distances to the target document are within a certain threshold are considered matches. This approach is not hierarchical or progressive with respect to the different levels of index information that is arranged in the feature vector because all such levels of index information is compared at once. This feature vector approach may be used as a part of a hierarchical comparison approach; for example, the document-level index information (number of pages) may be used first to narrow the field of candidates, and then the remaining levels of index information is arranged into one feature vector and used to compare the target document with the remaining candidates as described above. This retrieval method is schematically illustrated in FIG. 7. In FIG. 7, step S701 is similar to step S201 of FIG. 2; step S702 corresponds to the analyses in steps S202, S204, S206 and S208 of FIG. 2; and step S703 corresponds to the comparisons in some (or none) of steps S203, S205 and S207 in FIG. 2. Step S704 computes the feature vectors and their distances, and step S705 identifies zero, one or more matching documents, as described above.

As pointed out earlier, many different comparison flows can be used to implement the document retrieval process. The processes described above are merely examples.

In the above described embodiments, index information for the stored document images is generated prior to retrieval and is stored in the database. Alternatively, indexing of the stored document images may be performed on the fly, i.e., during the retrieval process. However, such an approach may be slow.

The document indexing and retrieval processes according to embodiments of the present invention may be used as a part of an image-based document authentication system. In such applications, the retrieval step can an inherent part of the authentication process when document identity is not available from the document itself. For example, in some document authentication systems, a document ID is printed on the document itself such as by using a printed barcode, but during document circulation, the barcode may become compromised or missing. In such a document authentication system, the target document is first used to retrieve one or more candidate documents, and the target document image is compared to the candidate document image to determine if the target document is an authentic copy of one of the candidate documents. Any suitable image comparison methods may be used for this purpose.

As mentioned earlier, fuzzy logic is sued during document retrieval which makes the retrieval process robust even when the target documents have been slighted tampered with or damaged. Robustness is particularly important in some applications, such as document authentication as described in U.S. Pat. Nos. 7,965,894, 7,999,657 and 8,000,528.

While specific definitions of various levels of document index information are provided above (e.g. FIGS. 3-5), the invention is not limited to these specific definitions. The various levels of index information may include other items or omit some of the items described above. More generally, document-level index information includes information that describes geometric characteristics of a document; page-level index information includes information that describes geometric characteristics of each page of the document; region-level index information includes information that describes geometric characteristics of each text or non-text regions of the document; and unit-level index information includes information that describes geometric characteristics of text units in each text regions. The definition of index information (and hence the algorithm for calculating the index information) should be the same in the document indexing stage and the document retrieval stage.

The image-based document indexing and retrieval processes described above can be implemented in a data processing system which includes a processor and a memory or storage device. The data processing system may be a standalone computer or it may be contained in a printer, a scanner or a multi-function device. The data processing system carries out the method by the processor executing computer programs stored in the memory or storage device. Two or more separate data processing systems may be used to perform document indexing and document retrieval. In one aspect, the invention is embodied in a data processing system. In another aspect, the invention is computer program product embodied in computer usable non-transitory medium having a computer readable program code embedded therein for controlling a data processing apparatus. In another aspect, the invention is a method carried out by a data processing system.

It will be apparent to those skilled in the art that various modification and variations can be made in the image-based document indexing and retrieval method and related apparatus of the present invention without departing from the spirit or scope of the invention. Thus, it is intended that the present invention cover modifications and variations that come within the scope of the appended claims and their equivalents.

What is claimed is:

1. An image-based document indexing method implemented in a data processing system which includes a processor and a memory or storage device, the method comprising:
   (a) the data processing system obtaining a document image including at least one page;
   (b) the data processing system segmenting the page of the document image into one or more text regions;
   (c) the data processing system analyzing the page of the document image to generate page-level index information;
   (d) for each text region in the page:
      (d1) the data processing system segmenting the region into a plurality of units each having a unit length and/or a unit density; and
      (d2) the data processing system generating a unit length histogram and/or a unit density histogram, wherein the unit length histogram has a plurality of bins and represents a relationship between the unit length and a frequency of occurrence of the units within the region, the unit density histogram has a plurality of bins and represents a relationship between the unit density and a frequency of occurrence of the units within the region, and wherein each unit of the region belongs to a bin of the unit length histogram or the unit density histogram;
   wherein the unit length histogram or unit density histogram forms region-level index information for the region;
   (e) for each text region, and for each of a number of designated bins of the unit length histogram or unit density histogram, including a most frequent bin and zero or more bins around the most frequent bin:
      (e1) the data processing system characterizing each unit belonging to the bin into a unit type and obtain a number of unit types in the bin; and
      (e2) for each of a number of designated unit types, the data processing system obtaining a number of units belonging to the unit type, locations of such units, and a unit feature vector or unit image patch of the unit type;
   wherein the identity of the designated bins, the numbers of unit types in each designated bin, the number of units belonging to each designated unit type and the locations of such units, and the unit feature vector or unit image patch of each designated unit type collectively form unit-level index information for the region; and
   wherein the page-level index information, the region-level index information and the unit-level index information collectively form the document index information of the document image.

2. The method of claim 1, further comprising:
   the data processing system analyzing a document image to generate document-level index information including a number of pages of the document,
   wherein the document-level index information forms a part of the document index information.

3. The method of claim 1, further comprising:
   for each text region in the page:
      the data processing system generating a region bounding box; and
      the data processing system segmenting the region into one or more lines of text and counting a number of lines of text in the region;

wherein the region bounding box and the number of lines form a part of the region-level index information for the text region.

4. The method of claim 1, wherein the step of segmenting the page includes segmenting the page of the document image into one or more text regions and zero or more non-text regions, and wherein the page-level index information includes a page bounding box and numbers of text and non-text regions on the page.

5. The method of claim 4, further comprising:
for each non-text region in the page:
the data processing system generating a region bounding box; and
the data processing system generating a feature vector for the region;
wherein the region bounding box and the feature vector for the non-text region form a part of the region-level index information for the non-text region.

6. The method of claim 1, wherein the document image is a source document image, the method further comprising:
the data processing system storing the document image and the indexing information in a database.

7. An image-based document retrieval method implemented in a data processing system which includes a processor and a memory or storage device, the method comprising:

(a) the data processing system obtaining index information for a target document image, the index information including page-level index information that includes geometric characteristics of a page of the target document, region-level index information that includes geometric characteristics of text regions of the page of the target document, and unit-level index information that includes geometric characteristics of text units in each text region of the page of the target document;

(b) the data processing system accessing a database which stores index information for a plurality of source documents, the index information including, for each source document, page-level index information that includes geometric characteristics of a page of the source document, region-level index information that includes geometric characteristics of text regions of the page of the source document, and unit-level index information that includes geometric characteristics of text units in each text region of the page of the source document;

(c) the data processing system comparing the page-level index information for the page of the target document image with stored page-level index information for a plurality of source documents to identify one or more pages of one or more source documents with page-level index information that matches the page-level index information of the page of the target document;

(d) the data processing system comparing the region-level index information for the page of the target document image with stored region-level index information for the one or more pages identified in step (c) to further identify one or more pages of one or more source documents with region-level index information that matches the region-level index information of the page of the target document;

(e) the data processing system comparing the unit-level index information for the page of the target document image with stored unit-level index information for the one or more pages identified in step (d) to further identify one or more pages of one or more source documents with unit-level index information that matches the unit-level index information of the page of the target document.

8. The method of claim 7, wherein in each of steps (c), (d) and (e), the respective index information for the target document image and stored index information are determined to match each other if their difference is within defined tolerance values.

9. An image-based document retrieval method implemented in a data processing system which includes a processor and a memory or storage device, the method comprising:

(a) the data processing system obtaining index information for a target document image, the index information including page-level index information that includes geometric characteristics of a page of the target document, region-level index information that includes geometric characteristics of text regions of the page of the target document, and unit-level index information that includes geometric characteristics of text units in each text region of the page of the target document;

(b) the data processing system accessing a database which stores index information for a plurality of source documents, the index information including, for each source document, page-level index information that includes geometric characteristics of a page of the source document, region-level index information that includes geometric characteristics of text regions of the page of the source document, and unit-level index information that includes geometric characteristics of text units in each text region of the page of the source document;

(c) for each of at least some of the source documents, the data processing system calculating a distance between a feature vector of the target document image, which is constructed from one or more levels of index information of the target document image, and a feature vector of the source document, which is constructed from corresponding one or more levels of index information of the source document;

(d) based on the calculation in step (c), the data processing system identifying one of the at least some of the source documents that has a smallest distance, or identifying zero or more of the at least some of the source documents that have a distance smaller than a predetermined threshold.

10. A computer program product comprising a computer usable non-transitory medium having a computer readable program code embedded therein for controlling a data processing apparatus, the computer readable program code configured to cause the data processing apparatus to execute an image-based document indexing process which comprises:

(a) obtaining a document image including at least one page;

(b) segmenting the page of the document image into one or more text regions;

(c) analyzing the page of the document image to generate page-level index information;

(d) for each text region in the page:
(d1) segmenting the region into a plurality of units each having a unit length and/or a unit density; and
(d2) generating a unit length histogram and/or a unit density histogram, wherein the unit length histogram has a plurality of bins and represents a relationship between the unit length and a frequency of occurrence of the units within the region, the unit density histogram has a plurality of bins and represents a relationship between the unit density and a frequency of occurrence of the units within the region, and wherein each unit of the region belongs to a bin of the unit length histogram or the unit density histogram;

wherein the unit length histogram or unit density histogram forms region-level index information for the region;

(e) for each text region, and for each of a number of designated bins of the unit length histogram or unit density histogram, including a most frequent bin and zero or more bins around the most frequent bin:

(e1) characterizing each unit belonging to the bin into a unit type and obtain a number of unit types in the bin; and (e2) for each of a number of designated unit types, obtaining a number of units belonging to the unit type, locations of such units, and a unit feature vector or unit image patch of the unit type;

wherein the identity of the designated bins, the numbers of unit types in each designated bin, the number of units belonging to each designated unit type and the locations of such units, and the unit feature vector or unit image patch of each designated unit type collectively form unit-level index information for the region; and wherein the page-level index information, the region-level index information and the unit-level index information collectively form the document index information of the document image.

11. The computer program product of claim 10, wherein the image-based document indexing process further comprises:

analyzing a document image to generate document-level index information including a number of pages of the document, wherein the document-level index information forms a part of the document index information.

12. The computer program product of claim 10, wherein the image-based document indexing process further comprises:

for each text region in the page:
  generating a region bounding box; and
  segmenting the region into one or more lines of text and counting a number of lines of text in the region;

wherein the region bounding box and the number of lines form a part of the region-level index information for the text region.

13. The computer program product of claim 10, wherein the step of segmenting the page includes segmenting the page of the document image into one or more text regions and zero or more non-text regions, and wherein the page-level index information includes a page bounding box and numbers of text and non-text regions on the page.

14. The computer program product of claim 13, wherein the image-based document indexing process further comprises:

for each non-text region in the page:
  generating a region bounding box; and
  generating a feature vector for the region;

wherein the region bounding box and the feature vector for the non-text region form a part of the region-level index information for the non-text region.

15. The computer program product of claim 10, wherein the document image is a source document image, and wherein image-based document indexing process further comprises:

storing the document image and the indexing information in a database.

16. A computer program product comprising a computer usable non-transitory medium having a computer readable program code embedded therein for controlling a data processing apparatus, the computer readable program code configured to cause the data processing apparatus to execute an image-based document retrieval process which comprises:

(a) obtaining index information for a target document image, the index information including page-level index information that includes geometric characteristics of a page of the target document, region-level index information that includes geometric characteristics of text regions of the page of the target document, and unit-level index information that includes geometric characteristics of text units in each text region of the page of the target document;

(b) accessing a database which stores index information for a plurality of source documents, the index information including, for each source document, page-level index information that includes geometric characteristics of a page of the source document, region-level index information that includes geometric characteristics of text regions of the page of the source document, and unit-level index information that includes geometric characteristics of text units in each text region of the page of the source document;

(c) comparing the page-level index information for the page of the target document image with stored page-level index information for a plurality of source documents to identify one or more pages of one or more source documents with page-level index information that matches the page-level index information of the page of the target document;

(d) comparing the region-level index information for the page of the target document image with stored region-level index information for the one or more pages identified in step (c) to further identify one or more pages of one or more source documents with region-level index information that matches the region-level index information of the page of the target document;

(e) comparing the unit-level index information for the page of the target document image with stored unit-level index information for the one or more pages identified in step (d) to further identify one or more pages of one or more source documents with unit-level index information that matches the unit-level index information of the page of the target document.

17. The computer program product of claim 16, wherein in each of steps (c), (d) and (e), the respective index information for the target document image and stored index information are determined to match each other if their difference is within defined tolerance values.

18. A computer program product comprising a computer usable non-transitory medium having a computer readable program code embedded therein for controlling a data processing apparatus, the computer readable program code configured to cause the data processing apparatus to execute an image-based document retrieval process which comprises:

(a) obtaining index information for a target document image, the index information including page-level index information that includes geometric characteristics of a page of the target document, region-level index information that includes geometric characteristics of text regions of the page of the target document, and unit-level index information that includes geometric characteristics of text units in each text region of the page of the target document;

(b) accessing a database which stores index information for a plurality of source documents, the index information including, for each source document, page-level index information that includes geometric characteristics of a page of the source document, region-level index information that includes geometric characteristics of text regions of the page of the source document, and unit-level index information that includes geometric characteristics of text units in each text region of the page of the source document;

(c) for each of at least some of the source documents, calculating a distance between a feature vector of the target document image, which is constructed from one or more levels of index information of the target document image, and a feature vector of the source document, which is constructed from corresponding one or more levels of index information of the source document;

(d) based on the calculation in step (c), identifying one of the at least some of the source documents that has a smallest distance, or identifying zero or more of the at least some of the source documents that have a distance smaller than a predetermined threshold.

* * * * *